(12) United States Patent
Greiss et al.

(10) Patent No.: US 9,110,263 B2
(45) Date of Patent: Aug. 18, 2015

(54) SYSTEM AND METHOD FOR ALIGNING A MULTI-CORE PLASTIC OPTICAL FIBER ASSEMBLY

(75) Inventors: Israel Greiss, Ra'anana (IL); Nir Yona, Tel-Aviv (IL); Gerardo Nahum, Tel-Aviv (IL); Omri Raisman, Ein-Vered (IL)

(73) Assignee: ACRYLICOM LTD., Netanya (IL)

( * ) Notice: Subject to any disclaimer, the term of this patent is extended or adjusted under 35 U.S.C. 154(b) by 527 days.

(21) Appl. No.: 13/510,267

(22) PCT Filed: Nov. 16, 2010

(86) PCT No.: PCT/IL2010/000953
§ 371 (c)(1),
(2), (4) Date: Nov. 20, 2012

(87) PCT Pub. No.: WO2011/061735
PCT Pub. Date: May 26, 2011

(65) Prior Publication Data
US 2013/0058661 A1 Mar. 7, 2013

Related U.S. Application Data

(60) Provisional application No. 61/262,617, filed on Nov. 19, 2009.

(51) Int. Cl.
*G02B 6/26* (2006.01)
*G02B 6/42* (2006.01)
(Continued)

(52) U.S. Cl.
CPC ............... *G02B 6/4249* (2013.01); *G02B 6/06* (2013.01); *G02B 6/02042* (2013.01); *G02B 6/3801* (2013.01); *Y10T 29/4978* (2015.01); *Y10T 29/49769* (2015.01)

(58) Field of Classification Search
CPC .... G02B 6/06; G02B 6/3801; G02B 6/02042; G02B 6/4249
USPC ............................. 385/15, 52; 398/142, 156
See application file for complete search history.

(56) References Cited

U.S. PATENT DOCUMENTS

| 5,519,801 A | 5/1996 | Le Noane et al. |
| 5,706,380 A | 1/1998 | Le Noane et al. |

(Continued)

OTHER PUBLICATIONS

International Search Report, mailed on May 12, 2011, for PCT International Application No. PCT/IL2010/000953.

*Primary Examiner* — Ryan Lepisto
*Assistant Examiner* — Guy Anderson
(74) *Attorney, Agent, or Firm* — Pearl Cohen Zedek Latzer Baratz LLP (57) ABSTRACT

A multi-core plastic optical fiber is used for multi-channel communication purposes. An alignment tool comprising a light source, selective filter and a detachable alignment-tube having a guide notch is provided to map the individual cores of a multi-core plastic optical fiber and prepare the connection of optical transceivers to both exposed ends of a pre-cut length of fiber. The alignment method results in a pre-cut length of fiber having alignment-tubes with guide notches secured to both ends. Transceiver guide projections mate to the notches, creating a complete optical multi-path between the transceiver active elements through the fiber cores. An automatic method of assembling optical transmitters to a multi-core fiber and mating optical receivers uses no alignment tools and tubes. This method dictates a specific placement of the optical transmitters in relation to the cores and receivers, assigning each transmitter to a preferred receiver based on detected light signal criteria.

2 Claims, 5 Drawing Sheets (51) Int. Cl.
*G02B 6/06* (2006.01)
*G02B 6/02* (2006.01)
*G02B 6/38* (2006.01)

(56) References Cited

U.S. PATENT DOCUMENTS

| | | |
|---|---|---|
| 5,732,175 A | 3/1998 | Fan |
| 6,154,594 A | 11/2000 | Fiacco et al. |
| 6,188,824 B1 | 2/2001 | Teshima |
| 6,292,610 B1 | 9/2001 | O'Rourke et al. |
| 6,445,868 B1 * | 9/2002 | Grunbeck et al. ............ 385/138 |
| 2002/0181909 A1 * | 12/2002 | Grunbeck et al. ............ 385/123 |
| 2003/0081293 A1 * | 5/2003 | Wood et al. .................... 359/172 |
| 2004/0258370 A1 | 12/2004 | Bush et al. |
| 2007/0110370 A1 | 5/2007 | Grunberg et al. |
| 2008/0018989 A1 | 1/2008 | Tanigawa et al. |
| 2008/0269845 A1 * | 10/2008 | Rose et al. ..................... 607/88 |
| 2009/0285535 A1 * | 11/2009 | van Geffen et al. ............ 385/88 |
| 2011/0110673 A1 * | 5/2011 | Elberbaum ................... 398/202 |

* cited by examiner

SYSTEM AND METHOD FOR ALIGNING A MULTI-CORE PLASTIC OPTICAL FIBER ASSEMBLY

CROSS-REFERENCE TO RELATED APPLICATIONS

This application is a National Phase Application of PCT International Application No. PCT/IL2010/000953, International Filing Date Nov. 16, 2010, entitled "SYSTEM AND METHOD FOR ALIGNING A MULTI-CORE PLASTIC OPTICAL FIBER ASSEMBLY", published on May 26, 2011, as International Publication No. WO 2011/061735, which claims priority from U.S. Provisional Patent Application No. 61/262,617, filed Nov. 19, 2009, both of which are incorporated herein by reference in their entirety.

BACKGROUND OF THE INVENTION

The increasing demand for high speed and secure communication can be achieved by using known in the art glass fiber-optic links. When the practical limit on a single physical link is met, several links can be aggregated. Aggregation of fiber-optic links is usually done using bundles or ribbons made of several fibers. Glass fiber-optic cables are preferably used for long distance communication links. The use of cable connectors and installation procedures for glass fiber-optics aggregations is complex and expensive.

Another option is the use of Plastic Optic Fibers (POF). POFs are known in the art plastic fibers having comparatively large diameter core in the range of 0.2 to 1.0 mm. used for light transmission in the communication and control industry. POF cables are preferably used for short length links. POF single core cables excel in straight forward, low cost connection processes. In some applications the cutting of the fiber cable can be performed in the field even with a simple knife.

Multi-Core POF (MC-POF) is a type of optical fiber constructed of many small diameter optical cores. The main benefit of such a fiber is its improved bending radius, which is related to the smaller core diameter. One practical application of MC-POF is in combination with optical transceivers—optical transmitters and receivers sharing the same housing and some circuitry, which convert electric signals into light signals and vice versa.

Figure 1A:
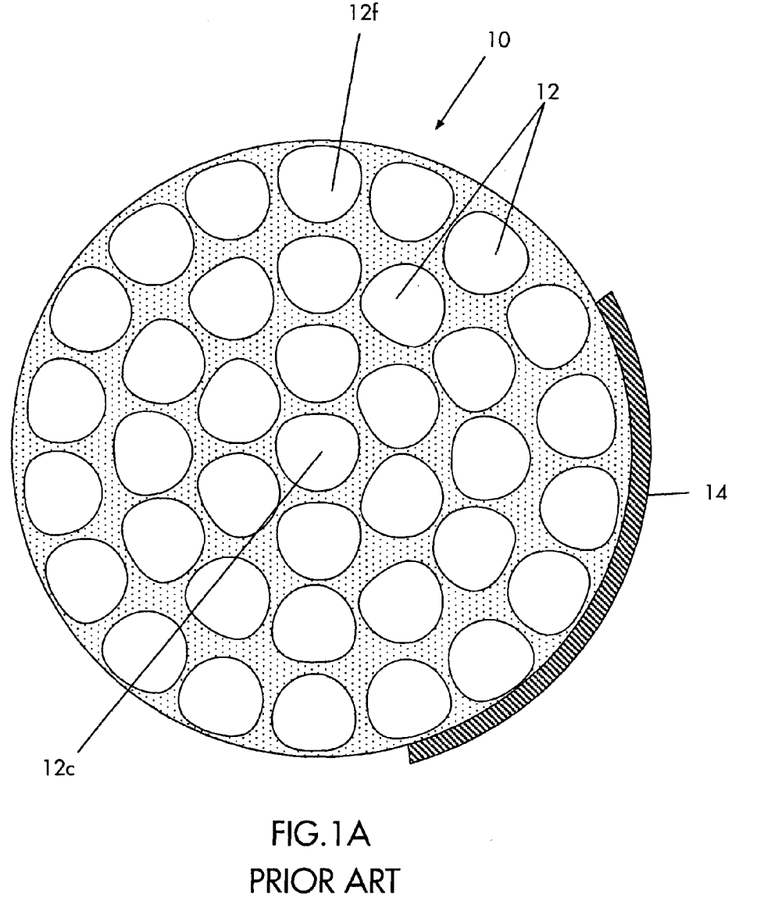
FIG. 1A shows a cross section of a prior art 37-core plastic optical fiber by ASHAI of Japan.

FIG. 1A illustrates a cross section of a known in the art Multi-Core Plastic Optical Fiber (MC-POF) 10, which is made of a multitude of plastic cores 12 arranged in a circular structure, embedded in an opaque flexible bonding material and covered by a jacket 14. In the example of FIG. 1A there are 37 cores arranged in three concentric circles around center core 12c. MC-POFs by ASHAI of Japan type SMCK1000P have different number of cores 12 in each fiber, e.g. nineteen cores or thirty seven cores. The diameter of each core 12 in the nineteen core fiber can be, for example, 0.2 mm and the fiber outer diameter may be 1.5 mm. In prior art the MC fiber is used preferably as a single link data communication, wherein part or all cores in the fiber conduct light generated by a single source. One benefit in using MC-POF as compared to a single core POF may be to achieve an improved bending radius, which may be advantageous in the installation process of optical cables.

Figure 1B:
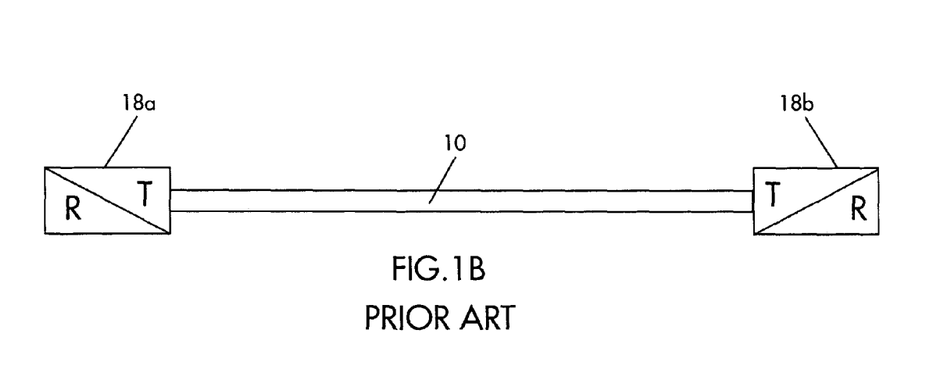
FIG. 1B shows an assembly of a multi-core plastic optical fiber connected to optical transceivers, used in prior art single channel communication links.

The practical use of MC-POFs in the industry and in the field requires connection of known in the art optical transceivers on both sides of the fiber. FIG. 1B describes schematically an optical assembly of MC-POF 10 with two optical transceivers 18a and 18b connected on both side of a segment of the fiber 10.

It is possible theoretically to use the MC fiber to communicate several data links in parallel, using individual cores in the fiber as independent data links.

There is a need for apparatus and methods to enable an efficient and effective connection, including alignment, between Plastic Optical Fiber individual cores in a MC fiber and their related multi transmitter/receiver optical transceivers.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF EMBODIMENTS OF THE INVENTION

Embodiments of the invention may use a MC fiber to communicate several data links in parallel, using individual cores in the fiber as independent data links. The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 2A:
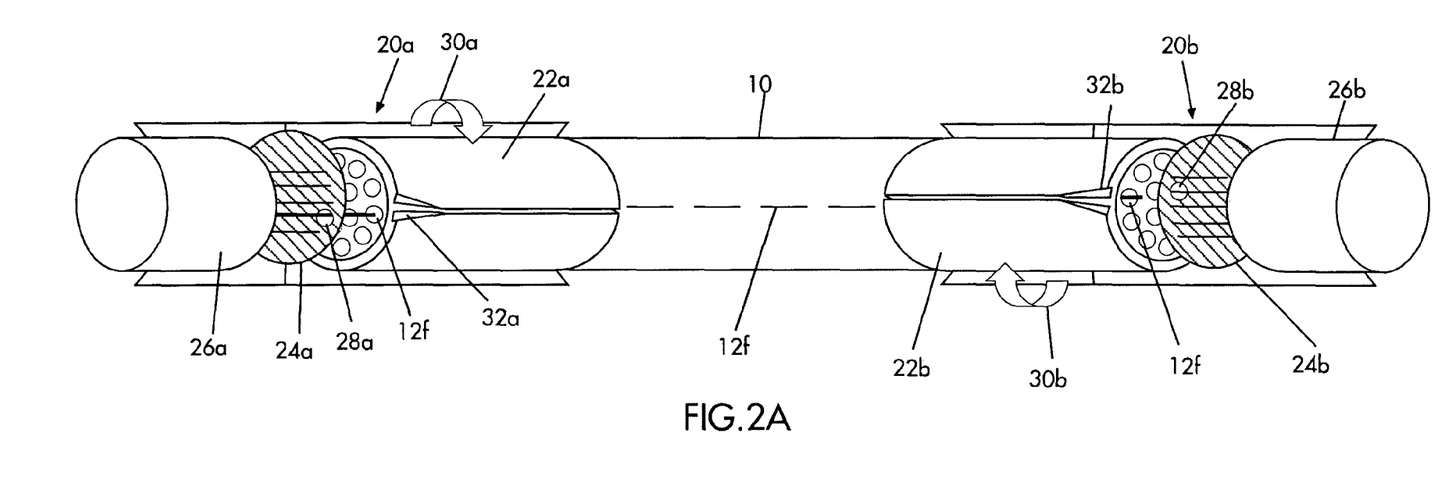
FIG. 2A shows a view of a multi-core plastic optical fiber connected to two alignment modules according to some embodiments of the present invention.

Reference is made to FIG. 1A and FIG. 1B that provide a general view of prior art. FIG. 1A shows a cross section of a 37-core plastic optical fiber 10. As shown, a MC-POF 10 may be enclosed by a jacket 14 and a plurality of cores 12 may be concentrically arranged around a center core 12c. As shown, core 12f may, in the discussion herein, be referred to as a reference core. FIG. 1B shows a high level view of an assembly MC-POF 10 connected to optical transceivers 18a and 18b. Transceivers 18a and 18b may comprise one or more transmitters configured to transmit optical signals and a one or more receivers configured to receive optical signals. FIG. 2A illustrates a first embodiment of an alignment device used to facilitate the attachment of optical transceivers 18a and 18b of FIG. 1B to the exposed ends of a MC-POF 10. The alignment procedure to be explained herewith may enable a MC-POF to communicate data over a multitude of links. The theoretical number of communication links available in a single MC-POF is one to N, N being the maximum number of cores built and included in the specific fiber.

The transceivers 18a and 18b of FIG. 1B may be used with a multi-link MC-POF and may each have one or more known in the art light emission or transmission means, for example, light emitting diodes (LEDs) and one or more known in the art light receivers, detectors or sensors. The positioning of the light transmitters and light detectors vis-a-vis the exposed cores of the MC-POF will be discussed further on. Successful operation of a communication link may require correct positioning or alignment of these light emission and detection means with respect to the fiber cores.

Having a length of MC-POF 10, as shown in FIG. 2A, cut and exposed at both ends, the two fiber ends may be "mapped" to determine the correspondence between the first end of a reference core 12f and the second exposed end of same reference core 12f at the other end of the fiber. The "map" or position of each individual core 12 in reference to core 12f in the cross section of fiber 10 shown for example in FIG. 1A is given by the manufacturer of the MC-POF. Once "mapped", the MC-POF is ready for the connection of the corresponding multi-link transceivers, which will be self-aligned to the fiber cores. The MC-POF will consequently be prepared to function as a multi-link data communication means.

The "mapping" of the cores 12 in a length of MC-POF 10 is explained with respect to the MC-POF 10 cross section shown in FIG. 1A. Fiber core 12f on the outer circle of cores in the cross section is chosen as a "reference core". In practice, the geometrical cross section of each core 12 in the fiber 10 is a "squashed" circle, but for explaining the self alignment feature we can assume the geometrical cross section of each core 12 in the fiber 10 to be circular. The geometrical position of the center of each "circle" representing cores 12 in MC-POF 10 may be given by the manufacturer and known. Accordingly, the location and tagging of the center of the circle 12f chosen as "reference core" may automatically define the location of all other core centers in the same fiber.

Figure 2B:
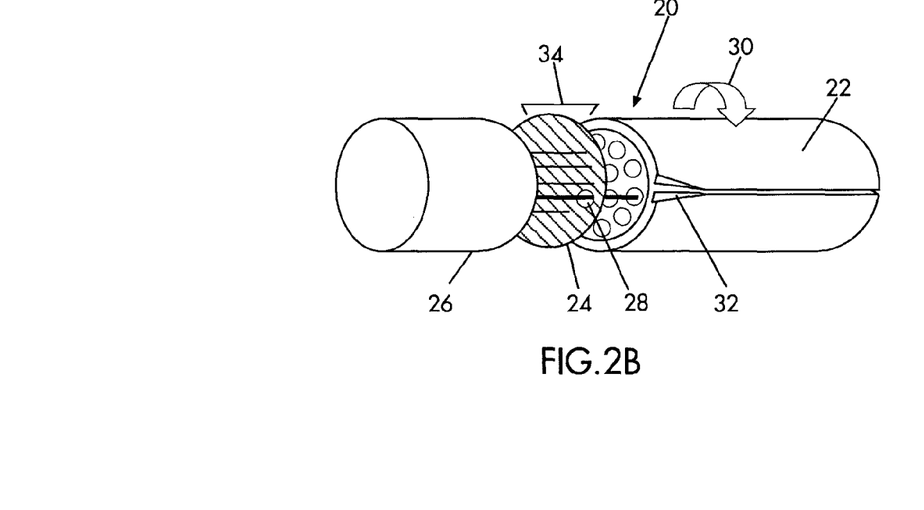
FIG. 2B shows an alignment module according to some embodiments of the present invention.

The means and methods disclosed herein for the location and tagging of the center of the circle representing core 12f are explained with reference to FIG. 2A and FIG. 2B. As shown, alignment device 20 shown in FIG. 2B is an assembly of alignment tube 22, selective filter 24 and light-source 26. Alignment tube 22 may be a slotted cylinder with an inner diameter fitting the outer jacket diameter of the specific MC-POF in use. Alignment tube 22 may be designed to rotate with selective filter 24 as a unit, but otherwise can be disengaged from that selective filter. A mechanism 34 enabling a rotation of assemblies 20a and 20b with respect to MC-POF 10, a disengagement of components of these assemblies and an attachment of components of these assemblies to MC-POF 10 is not shown. For example, light-source 26a, selective filter 24 and alignment tube 22 may be designed such that they may be rotated or otherwise manipulated together, or as a single element. Light-source 26a, selective filter 24 and alignment tube 22 may be designed such that they may be disengaged. For example, light-source 26a and selective filter 24 may be detached from alignment tube 22.

Alignment tube 22 may be provided with a notch 32 which is useful in the self alignment process. Selective filter 24 is an opaque disc designed to prevent light from reaching the inner space of alignment tube 22 except for a small diameter hole 28 drilled at a preset location relative to notch 32 and designed to coincide (when rotated) with the center of circle 12c of FIG. 1A. The diameter of hole 28 and the location of hole 28 in selective filter 24 are dependent on the specification of the MC-POF in use with alignment device 20. For ASHAI of Japan type SMCK1000P nineteen core fiber the hole 28 will be of 0.1 mm. Light source 26 is preferably a LED device, fixed in alignment device 20 and emitting a parallel light beam having a diameter of selective filter 24. Another embodiment of selective filter 24 is to use a short section of the same fiber wherein all cores are covered or "sealed" except for the cores on the outer circle. In this case the LED light source 26 is fixed to the selective filter, and the selective filter is secured at a preset position relative to notch 32.

As described herein, assemblies 20, 20a and 20b may include a light source. In particular, these assemblies may be designed and/or configured to produce light on a predetermined section, area, part or portion of a surface of a conductor. For example, selective filter 24 may cause light emitted by a light source in assembly 20 to only reach one core in MC-POF 10. For example, light source 26, filter 24 and alignment tube 22 may be designed and/or constructed such that when assembled and connected to an exposed cross-section end of MC-POF 10, a single core (e.g., reference core 12f) is exposed to light emitted by a light source in assembly 26. Although for the sake of simplicity and clarity, a single hole 28 is shown it will be understood that various other arrangements are possible. For example, a number of cores 12 in MC-POF 10 may be selected and caused to be exposed to light as described herein using a selective filter 24 having a number of holes 28 or other openings. Accordingly, any portion of a surface of a conductor such as an open end of MC-POF 10 may be exposed to light according to any pattern.

When connected to an open end of a conductor such as MC-POF 10, assembly 26, filter 24 and alignment tube 22 may be rotated with respect to an open surface of the fiber. For example, filter 24 and alignment tube 22 may be rotated with respect to an axis coinciding with, or along an axis of MC-POF 10. Accordingly, the portion, part or area of a surface of an open end of MC-POF 10 to receive light from assembly 26 may be controlled. For example; filter 24 and alignment tube 22 may be rotated to a position such that an intersection of hole 28 and core 12f is maximized. Other wise described, the assemblies may be rotated such that a maximal portion of light traveling through hole 28 reaches core 12f. In one embodiment, to determine a maximal value of light emitted by assembly 26 reaches core 12f, or any other core in a bundle of cores in a first end of a conductor, a signal emitted from a second end of the conductor may be measured and a maximal value of the measured signal may be recorded. When a maximal value is recorded, alignment tube 22 may be fastened or clamped to the first end. Next, a similar assembly comprising assembly 26, filter 24 and alignment tube 22 and connected to the second end of the conductor may be rotated as described herein, and a maximal value of an emitted signal from the first end may be recorded with respect to the rotation. When a maximal value or level of a signal is observed at the first end, an alignment tube 22 connected to the second end may be fastened or clamped to the second end as described herein. A light conductor and connected alignment tubes as described herein may constitute an alignable assembly. An alignable light conductor may be a conductor that may be aligned with a light receiver and/or light transmitter. For example, a marking on an alignable conductor may indicate a location of cores within the conductor. Accordingly, the location of one or more cores within a conductor may be aligned with one or more receivers or transmitters. For example, notches 32 on alignment tubes 22 securely connected to a conductor as described herein may be used to align the conductor such that the location of cores within the conductor is well defined. Accordingly, cores in a MC-POF may be aligned with mating receivers or transmitters.

According to one embodiment of the invention means and method for manual producing an alignable conductor may be provided. According to another embodiment of the invention a system and method for producing an alignable conductor may be provided. A system and method according to embodiments of the invention may produce a light conductor having references or markings associated with two ends of the conductor such that a respective location of one or more ends or openings of cores included in the conductor may be determined based on the references. A system according to one embodiment may include two assemblies similar to assemblies 20 as described herein with respect to FIG. 2B. Assemblies 20 in a system may be connected to a controller configured to control these assemblies and to receive input from the assemblies. In particular, a controller may control emission of light by a light source in an assembly such as assembly 26 and further receive indication of received light by such assembly.

Provided with a conductor fitted with, or attached to, selective filters 24 and alignment tubes 22 as described herein, a controller may cause an assembly 20 connected to a first end of the conductor to produce light as described herein, and a component of the system may rotate the attached filter and alignment tube relative to first end of the conductor. The controller may record a signal received at the second end of the conductor and cause the rotation of the first end to cease when maximal or predefined signal strength is recorded. The system may comprise a component for fastening or clamping the alignment tube onto the first end when a predefined or maximal signal value is recorded at the second end. Possibly after a first alignment tube is securely attached to a first end of a conductor, the second end of the conductor (and attached selective filter and alignment tube) may be rotated and a signal received at the first end may be recorded. Upon detecting a maximum value of the signal received at the first end, the controller may cause the alignment tube connected to the second end to be clamped to the second conductor's end or opening.

Figure 5:
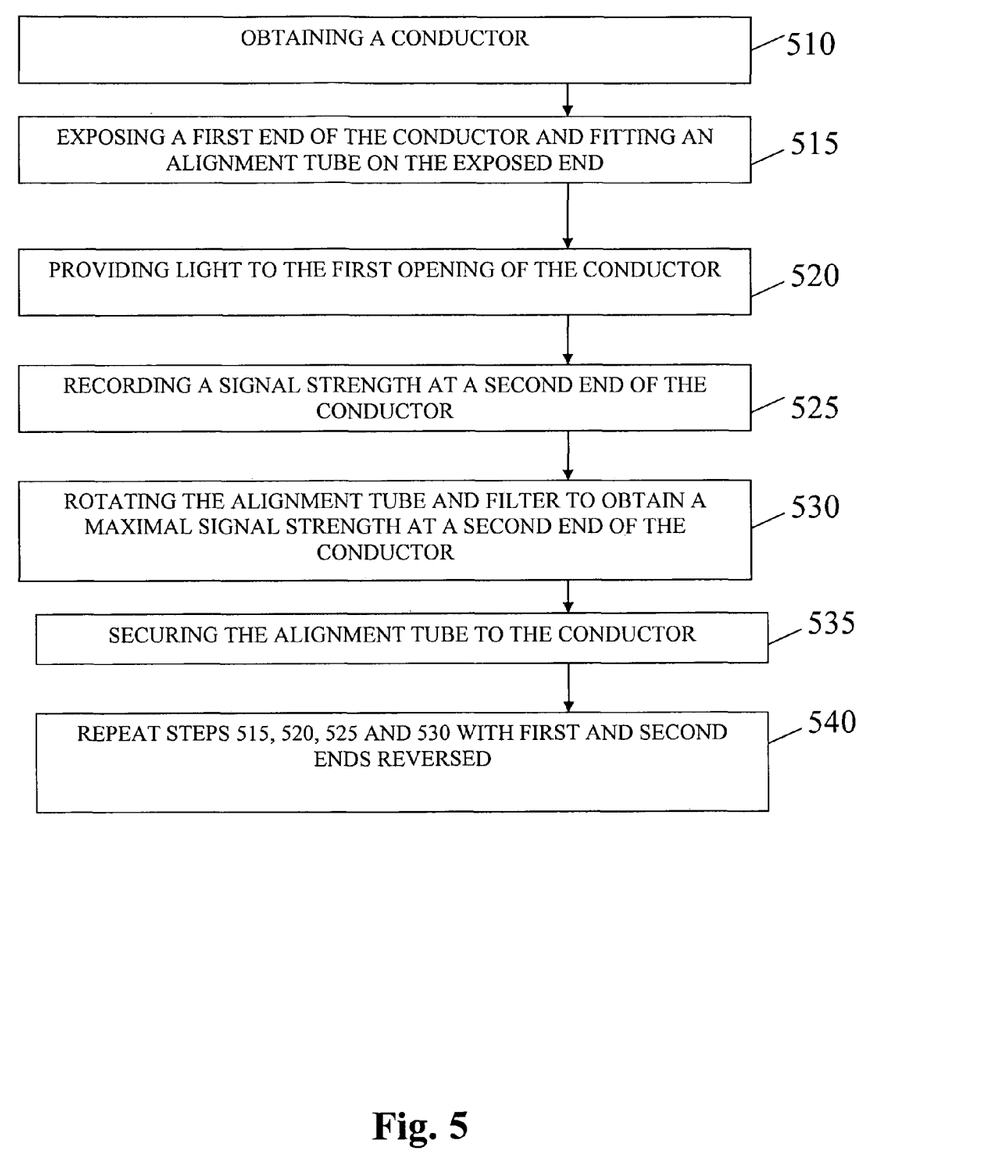
FIG. 5 shows a flow-chart illustrating a method in accordance with embodiments of the present invention.

Reference is now made to FIG. 5, showing a flowchart describing a method according to embodiments of the invention. Steps of a method of alignment are provided with reference to FIG. 4 and FIG. 2A. As shown by block 510, the flow may include obtaining a conductor. For example, target MC-POF 10 may be provided as known, e.g., cut to a desired length.

Figure 2C:
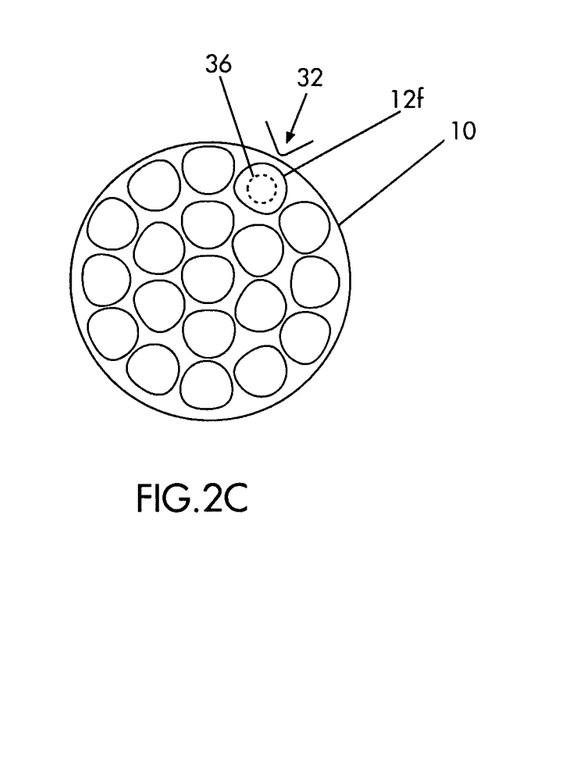
FIG. 2C shows a cross section of a nineteen-core plastic optical fiber.

As shown by block 515, the flow may include exposing a first end of the conductor and fitting an alignment device on the exposed end. For example, the first exposed end of MC-POF 10 may be inserted into tube 22a of Alignment device 20a. As shown by block 520, the flow may include providing light to an opening of the conductor. For example, light source 26a may be turned on, emitting a circular beam onto filter disc 24a. The (for example) 0.1 mm diameter beam passing hole 28a hits the first exposed surface of MC-POF 10, The cross section of which is shown schematically in FIG. 2C. The beam hitting the surface is symbolized by circle 36 in FIG. 2C.

As shown by block 525, the flow may include recording a signal strength at a second end of the conductor. For example, a light sensing device (not shown) is attached to the second exposed end of MC-POF 10. The light sensing device can be a microscope (used manually or with a light sensor) or known in the art electronic light sensors.

As shown by block 530, the flow may include rotating the alignment tube and filter to obtain a maximal signal strength at a second end of the conductor. For example, alignment device 20a may be slowly rotated 30 relative to MC-POF 10 within the tube 22a in a first direction until a maximal light signal is observed, which indicates that the light beam passing through hole 28a (represented by spot 36) hits the center of reference cell 12f. For the second embodiment of the "selective filter" rotation 30 results in the illuminated beams coinciding progressively with the outer circle cores of the fiber up to a full match resulting in maximum signal at the detector. In some embodiments, rotation in a first direction may be performed until a decrease in received light signal is observed and then, a rotation in the opposite direction may be made to reach a position associated with a maximal value of received signal.

As shown by block 535, the flow may include securing the alignment tube to the conductor. For example, the method may include crimping tube 22a, using known in the art tools for this purpose. Accordingly, MC-POF 10 may now be fastened in tube 22a. Next, alignment tool 20a may be removed from tube 22a (which may stay fastened on the first end of MC-POF 10). As shown by block 540, the flow may include repeating at least some of the above steps with the roles of the second and first ends reversed. Accordingly, the second exposed end of MC-POF 10 is inserted into tube 22b of Alignment device 20b. Alignment device 20b is similar in structure and function to Alignment device 20a except for the position of hole 28b in selective filter disc 28b and the steps described above are repeated for said second end. The index "b" replaces "a" in the reference numerals. It must be stressed that the main steps of the method of alignment can be accomplished manually, using hand or lab tools but also automatically in a production line, using known in the art techniques.

Figure 4A:
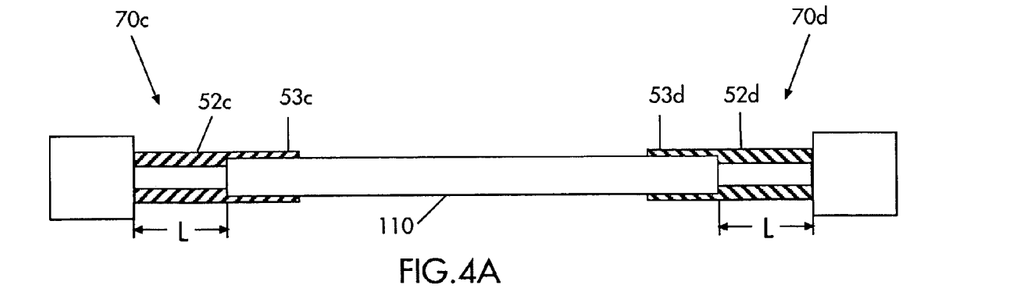
FIG. 4A shows a schematic view of a multi-core plastic optical fiber connected to two alignment modules according to some embodiments of the present invention.

The MC-POF may now be ready to be connected to the transceivers 18a and 18b of FIG. 1B. Optical transceivers 18a and 18b mate in practical use with alignment tubes 22a and 22b to form a self-aligned assembly. These transceivers will have their light emitters and detectors designed to meet the exposed end of cores 12 to form a multi-link MC-POF. The housing of said transceivers (not shown) carries a precise mechanical "tooth" which mates with the guide-notch of alignment tube 22. To distinguish a cut length of MC-POF 10 from the cut length mounted and crimped with alignment tubes 22 we will use numeral 100 for the ready to use part. A conductor such as a MC-POF may be provided with an initial length such that when connected to assemblies 22a and 22b its length is according to a desired, e.g., ordered length. Another optional Alignment tube 22 is described in reference to FIG. 4.

Figure 4B:
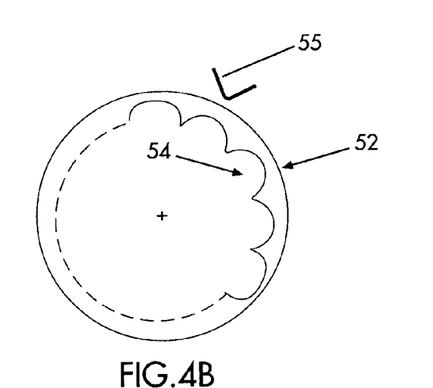
FIG. 4B shows a cross section of an alignment tube with recesses according to some embodiments of the present invention.
Figure 4C:
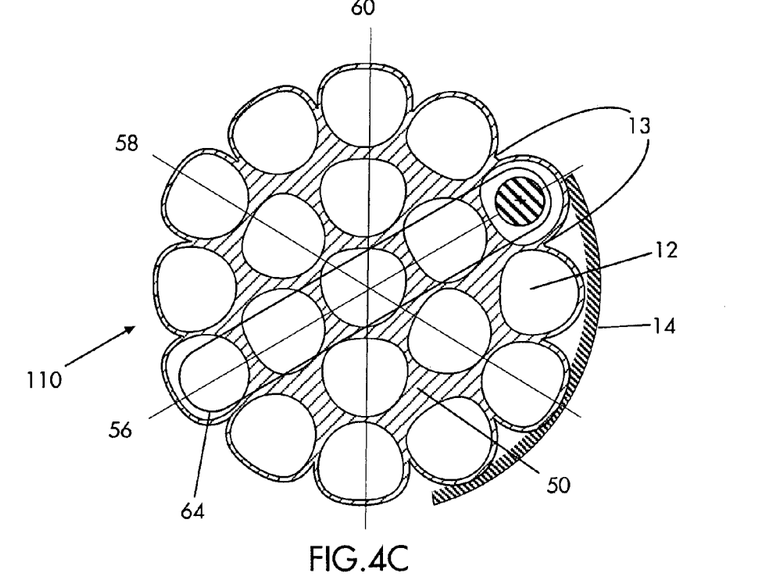
FIG. 4C shows an exemplary cross section of a stripped nineteen-core plastic optical fiber.

FIG. 4A illustrates an alternative embodiment to the alignment device in FIG. 2A and FIG. 2B, used to facilitate the attachment of transceivers 18c and 18d of FIG. 1B to the exposed ends of a MC-POF 110. This alternative embodiment is based on an essential feature in the construction of an exemplary nineteen core MC-POF shown in FIG. 4C. The ends of a given length of fiber 110 are stripped of its jacket 14 using known in the art tools. The length of jacket 14 stripped L can be for example 20 mm. The cross section of exposed fiber 110 is shown in FIG. 4C. It can be noticed that the opaque flexible bonding material 50, in which cores 12 are embedded, does not form a perfect circle under the jacket 14, but rather a "jagged" pattern forming twelve recesses 13 next to the twelve outer circle cores of fiber 110. These recesses 13 will be used in the alternative embodiment to the alignment apparatus.

The alternative embodiment of the alignment apparatus uses a hollow alignment tube 52 (FIGS. 4A and 4B) having an inner surface formed into the "jagged" pattern 54 matching the pattern of the circumference of the exposed part L of fiber 110. The hollow alignment tube 52 is designed to slide over the exposed part L of fiber 110. The rear part 53 of alignment tube 52 has an inner diameter fitting the outer diameter of the jacketed fiber. The rear part is slotted to facilitate crimping. The front part of alignment tube 52 has a guide notch (similar to the one shown in part 22 of FIG. 2). Having twelve recesses, alignment tube 52 can be mounted in twelve alternatives over the exposed part L of fiber 110. The first alignment tool 70c used in this embodiment is similar to part 20 of FIG. 2B with the difference that the "selective filter" and LED are replaced by a bar 64 having light emitter 62 (shown in FIG. 4c) built into alignment tube 52 in precise coordination with one of the twelve cores shown on the second concentric circle shown in FIG. 4C and with guide notch 55. The second alignment tool 70d is equipped with a light sensors (not shown) which is fixed within tool 70d and directed to sense light emerging from one of the twelve cores shown on the second concentric circle shown in FIG. 4C.

The alternative method is described herein with reference to FIGS. 4A, 4B, 4C and FIG. 2A. A target MC-POF 110 is cut as known in the art to the desired length and stripped of its outer jacket to a length L on both sides of the fiber. Next, the first exposed and stripped end of MC-POF 110 is inserted into tube 52c of Alignment device 70c. The stripped fiber will be inserted into tube 52c in one of twelve possible positions. Tube 53c may now be crimped, using known in the art tools for this purpose. MC-POF 110 is now fastened in tube 52c. Next, the second exposed and stripped end of MC-POF 110 is inserted into tube 52d of Alignment device 70d. While light emitter 62 in Alignment device 70c and the corresponding light sensor in device 70d are activated, alignment device 70d is stepped repeatedly to positions 56, 58, 60 marked in FIG. 4c. No more than six alternatives may be required to be tested to get maximum signal in the light sensor which indicates full alignment between the cores of both sides of the fiber. Next, tube 53d is crimped, using known in the art tools for this purpose. MC-POF 110 is now fastened in tube 52d.

Optical transceivers 18c and 18d (not shown) mate in practical use with alignment tubes 52c and 52d to form a self-aligned assembly. These transceivers will have their light emitters and detectors designed to meet the exposed end of cores 12 to form a multi-link MC-POF. The housing of said transceivers carries a precise mechanical "tooth" which mates with the guide notch 55 of alignment tube 52.

The alternative method using the cut and stripped length of fiber 110 can be used for a simple transmitter-receiver pair, where, for example, five transmitters are arranged along bar 64 in FIG. 4C. The light transmitters will be arranged in the transceiver to face the five corresponding cores 12. The receiver part of the transceiver, connected on the second end of fiber 110, will have five light sensors arranged in a similar way to the transmitters. Alignment of the transmitter group to the receiver group requires a minimal sequence of alternatives. In another embodiment transmitters and receivers can be mixed on a single bar 64 on both sides of the fiber 110 to create a bi-directonal multi-link communication device. More embodiments can be designed wherein transmitters and receivers will be arranged on diameters 58 and 60 of FIG. 4C.

Figure 3:
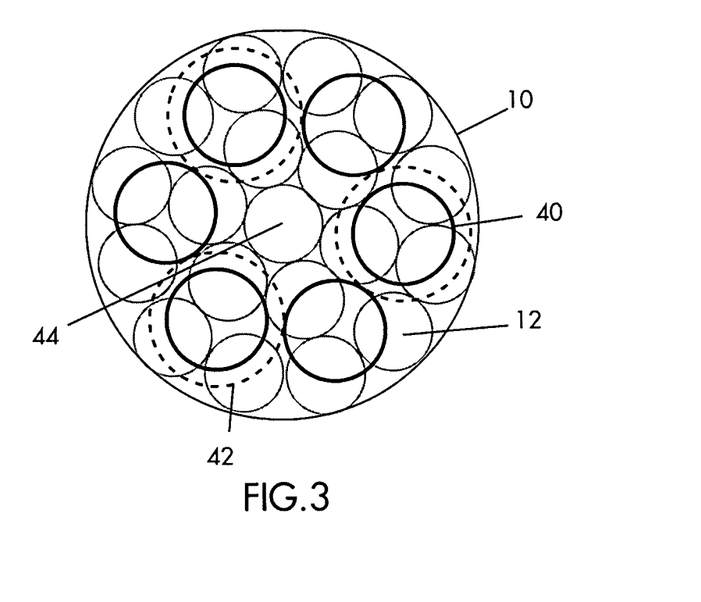
FIG. 3 shows a concentric arrangement of three light emitters and six light detectors facing a cross section of a nineteen-core plastic optical fiber and additional link on the center according to some embodiments of the present invention.

An automated method of self alignment of transceivers to MC-POF in a multi-link use is discussed in reference to FIG. 3, which refers to a cross section of an exemplary nineteen core ASHAI of Japan type SMCK1000P fiber. This method may not require alignment tubes or mechanical alignment procedures as described for the embodiments in FIG. 2 and FIG. 4. In this embodiment the nineteen cores 12 arranged in concentric circles are used by two groups of communication link: a) one link uses the center core 44. This center link need no alignment and will not be further discussed. b) The second group of communication links uses the cores arranged in a concentric circle around the center core 44. The second group of links can be used as one or more communication links.

If the second group of links is used as a single communication link there is no importance to the relative angle formed by the fiber cross section and the mating pattern light emitters and light sensors of the transceiver. In this case no alignment is needed. The case where the second group of links is operated for three communication links is discussed in reference to FIG. 3 and FIG. 1B. FIG. 1B represents, for example, a length of nineteen core fiber 10 cut and exposed at both ends a and b. Transceivers 18a and 18b are attached as known in the art to ends a and b. The organization of fiber cores 12 at both exposed ends of the fiber are shown in FIG. 3 on a concentric circle around center core 44. Three light emitters 42—part of the Transmitter in transceiver 18a—are shown in FIG. 3 in their relative position to the fiber cores 12. Six light detectors (or sensor) 40—on the other side of the fiber, part of the receiver in transceiver 18b—are shown in FIG. 3 in their relative position to the fiber cores 12 and light emitters 42.

The arrangement shown of light emitters 42, light detectors 40 and fiber cores 12 is calculated such that in any position of the three emitters 42 and six light detectors 40 relative to nineteen fiber cores 12, at least one detector will receive the signal of one of the three light emitters representing the three communication links. While the three light emitters 42 of transceiver 18a (of FIG. 1B) transmit via the fiber cores facing them, the corresponding three light detectors 40 of transceiver 18b (out of six available detectors) are selected according to the criteria of the strongest signal detected. The known in the art means performing said automatic selection is not shown.

The MIMO (Multiple In-Multiple Out) technique used mainly in wireless communication benefits from the different propagation paths from multiple transmitters to multiple receivers. We can define the method discussed above in reference to FIG. 3 and FIG. 1B as "3×6 MIMO". Other embodiments available for a nineteen core fiber are three links of "1×2 MIMO"—one transmitter and two receivers, and "4×7 MIMO"—4 transmitters to 7 receivers, which results in a better performance.

The "3×6 MIMO" example discussed above uses the fiber 10 for three communication links each using one light emitters 42 and two light detectors. It is an efficient architecture for our application as most crosstalk caused by miss-alignment occurs between two adjacent detectors located on the same concentric circle. In a MC-POF having N cores (for example 37 core) arranged in concentric circles (note FIG. 1A) additional concentric link groups can be added on a second circle.

What is claimed is:

1. A method of automatic self-alignment of a multi-core plastic optical fiber to optical transceivers attached to the ends of a pre-cut length of said fiber, comprising the steps of:

cutting a length of N-core plastic optical fiber, wherein said N cores are arranged in concentric circles around a center core;

providing at a first end of said fiber a first optical transceiver having one light emitter positioned opposite to the center core of said fiber and T light emitters positioned in a symmetric geometry opposite to the N cores of said fiber;

providing a second optical transceiver on the second end of said fiber having one light detector positioned opposite to the center core of said fiber and R light detectors positioned in a symmetric geometry related to the symmetric geometry of said T light emitters;

connecting said first optical transceiver to the exposed first end of said multi-core fiber;

connecting said second optical transceiver to the exposed second end of said multi-core fiber;

operating said first transceiver to emit light signals on each of said T light emitters, defining T communication links;

operating said second transceiver to detect light signals in each of said R light detectors; and selecting for each light emitter the corresponding one light detector having the strongest signal, whereby said assembly of N-core plastic optical fiber connected to said first and second transceivers is automatically self-aligned and said T light emitters and at least one of said R light detectors provide T communication links and wherein the center core and an additional emitter-detector pair provide an additional communication link.

2. The method of claim 1, the assembly comprising a length of nineteen-core plastic optical fiber connected to a first transceiver including three light emitters, and to a second transceiver including six light detectors, is automatically self-aligned providing three communication links and one center communication link provided by an additional emitter-detector pair mounted in said transceivers respectively.

* * * * *